US008842388B2

(12) United States Patent
Kato et al.

(10) Patent No.: US 8,842,388 B2
(45) Date of Patent: Sep. 23, 2014

(54) PERPENDICULAR MAGNETIC RECORDING HEAD AND METHOD FOR MANUFACTURING THE SAME

(75) Inventors: Atsushi Kato, Kanagawa (JP); Ichiro Oodake, Kanagawa (JP); Gen Oikawa, Kanagawa (JP); Masahiko Soga, Kanagawa (JP)

(73) Assignee: HGST Netherlands BV, Amsterdam (NL)

( * ) Notice: Subject to any disclaimer, the term of this patent is extended or adjusted under 35 U.S.C. 154(b) by 946 days.

(21) Appl. No.: 12/380,302

(22) Filed: Feb. 25, 2009

(65) Prior Publication Data

US 2009/0213496 A1 Aug. 27, 2009

(30) Foreign Application Priority Data

Feb. 26, 2008 (JP) ................... 2008-044189

(51) Int. Cl.
  *G11B 5/127* (2006.01)
  *G11B 5/17* (2006.01)
  *G11B 5/31* (2006.01)
  *B05D 5/12* (2006.01)

(52) U.S. Cl.
  CPC ............ *G11B 5/1278* (2013.01); *G11B 5/17* (2013.01); *G11B 5/3123* (2013.01); *G11B 5/3163* (2013.01); *G11B 5/315* (2013.01)
  USPC .................................. 360/125.12; G9B/5.04

(58) Field of Classification Search
  USPC .................................................. 360/123.09
  See application file for complete search history.

(56) References Cited

U.S. PATENT DOCUMENTS

| 5,173,826 | A | 12/1992 | Bischoff |
| 6,246,541 | B1 * | 6/2001 | Furuichi et al. .......... 360/125.54 |
| 6,353,511 | B1 * | 3/2002 | Shi et al. .................. 360/125.43 |
| 6,466,404 | B1 * | 10/2002 | Crue et al. ............... 360/125.53 |
| 6,751,054 | B2 | 6/2004 | Sato et al. |
| 7,554,763 | B2 * | 6/2009 | Sato ......................... 360/123.09 |
| 2004/0100728 | A1 * | 5/2004 | Sato et al. ..................... 360/123 |
| 2004/0179295 | A1 * | 9/2004 | Sato ............................ 360/123 |
| 2006/0126221 | A1 | 6/2006 | Kobayashi et al. |
| 2007/0211383 | A1 * | 9/2007 | Sunwoo et al. ................ 360/126 |
| 2007/0253107 | A1 * | 11/2007 | Mochizuki et al. .......... 360/126 |
| 2008/0002308 | A1 * | 1/2008 | Kudo et al. ................... 360/319 |
| 2009/0097158 | A1 * | 4/2009 | Neuhaus ................. 360/125.02 |

* cited by examiner

*Primary Examiner* — Kevin Bernatz (74) *Attorney, Agent, or Firm* — Daphne L. Burton; Burton IP Law Group (57) ABSTRACT

Embodiments of the present invention provide a perpendicular magnetic recording head including a coil having small resistance. According to one embodiment, a nonmagnetic insulating layer formed on a main magnetic pole and a magnetic yoke are etched to form a recessed portion. The thickness of a conductive layer is increased by the depth of the recessed portion in a process for forming the conductive layer of the upper coil on the recessed portion to reduce resistance of the coil. Simultaneously with the formation of the recessed portion, a part of a second layer of a connection tab is removed. Simultaneously with the formation of the conductive layer of the upper coil, a space in which the part of the second layer of the connection tab is removed is filled with the same material as that of the conductive layer to further reduce the resistance of the entire coil.

9 Claims, 9 Drawing Sheets

PERPENDICULAR MAGNETIC RECORDING HEAD AND METHOD FOR MANUFACTURING THE SAME

CROSS-REFERENCE TO RELATED APPLICATION

The instant nonprovisional patent application claims priority to Japanese Patent Application No. 2008-044189 filed Feb. 26, 2008 and which is incorporated by reference in its entirety herein for all purposes.

BACKGROUND OF THE INVENTION

A magnetic disk device uses a magnetic head to read and write data out of and from a recording medium. In order to increase a recording capacity of a magnetic disk per unit area, it is necessary to increase a surface recording density. In a current in-plane recording scheme, however, when a bit length to be recorded is reduced, the surface recording density cannot be increased due to heat fluctuation caused by magnetization in the recording medium. To solve the problem, there is a perpendicular recording scheme for recording a magnetization signal in a direction perpendicular to the surface of the recording medium. In the perpendicular recording scheme, in order to read data, a giant magnetoresistance effect (GMR) head, a tunnel magnetoresistance effect (TMR) head capable of providing a large reproduction output, and a current perpendicular to plane (CPP) GMR head capable of causing a current to flow perpendicularly to a film surface, are used. On the other hand, in order to write data, a single magnetic pole head is used.

In the perpendicular recording scheme, in order to increase the surface recording density, it is necessary to increase a track density and a linear recording density. In order to increase the track density and the linear recording density, it is necessary to prevent a fringe magnetic field from being generated from a main magnetic pole of the single magnetic pole head and cause the gradient of a magnetic field to be steep. To prevent the fringe magnetic field and cause the gradient of the magnetic field to be steep, it is effective to arrange a magnetic shield on a trailing side of the main magnetic pole and on both sides of the main magnetic pole. When the magnetic shield is arranged around the main magnetic pole, the intensity of the magnetic field generated from the main magnetic pole is reduced. It is therefore necessary to increase a current flowing in a coil. In order to increase the linear recording density, the frequency of a recording signal is high. When a magnetic path length of a magnetic circuit is large, a high frequency property is reduced. Thus, the width of a conductive coil layer is reduced, or the number of winding turns of the coil is reduced, to reduce the magnetic path length. Instead, a current flowing in the coil is increased. However, resistance of a coil of a thin film magnetic head is relatively high. When the width of the coil is reduced, the resistance of the coil is increased. An effect of heat generated from the coil due to the increase in the current is significant. That is, a portion present near a read/write element may protrude due to heat expansion caused by the heat generated from the coil and contact the magnetic disk.

To solve the problem, Japanese Patent Application No. 5-159234 discloses a thin film head assembly, for example. The thin film head assembly includes a coil structure having a thin coil layer and an additional coil layer. The thin coil layer extends through a magnetic yoke region having a contour between pole pieces facing each other. The additional coil layer is adjacent to the thin coil layer and formed as a stepwise segment. The additional coil layer is separated from the pole pieces and the magnetic yoke region, and constitutes a coil region having a large thickness to cause a reduction in the resistance of the coil.

In order to maintain a high efficiency by means of the thin film magnetic head including the perpendicular magnetic recording head, it is necessary to significantly reduce a coil pitch. This results in an increase in the resistance of the coil. In order to reduce the resistance of the entire coil of the thin film magnetic head, it is considered that the width of the coil is increased. However, the coil having a large width requires an excessively large yoke structure. This reduces an efficiency of a converter and a high frequency property. As another method, the thickness of the entire coil is increased. This method may cause halation in a process of exposing a photoresist. Therefore, the thickness of the entire coil is limited.

In order to maintain a high efficiency by means of a thin film magnetic head including a perpendicular magnetic recording head, it is necessary to significantly reduce a coil pitch. This results in an increase in resistance of the coil. When the resistance of the coil is increased, a portion present near a read/write element may protrude due to heat expansion caused by heat generated from the coil.

BRIEF SUMMARY OF THE INVENTION

Embodiments of the present invention provide a perpendicular magnetic recording head including a coil having small resistance. According to the embodiment of FIGS. 5(a) and 5(b), a nonmagnetic insulating layer 50 formed on a main magnetic pole 44 and a magnetic yoke (SP) 42 are etched to form a recessed portion 51. The thickness of a conductive layer (CD2) is increased by the depth 52 of the recessed portion 51 in a process for forming the conductive layer (CD2) of the upper coil 54 on the recessed portion 51 to reduce resistance of the coil. Simultaneously with the formation of the recessed portion 51, a part of a second layer (WAS) of a connection tab 60 is removed. Simultaneously with the formation of the conductive layer (CD2) of the upper coil, a space in which the part of the second layer (WAS) of the connection tab 60 is removed is filled with the same material (Cu) as that of the conductive layer (CD2) to further reduce the resistance of the entire coil.

DETAILED DESCRIPTION OF THE INVENTION

Embodiments of the present invention relate to a perpendicular magnetic recording head used in a magnetic recording device having a perpendicular magnetic recording scheme, and a method for manufacturing the perpendicular magnetic recording head.

An object of embodiments of the present invention is to provide a perpendicular magnetic recording head including a coil having small resistance.

Another object of embodiments of the present invention is to provide a method for manufacturing the perpendicular magnetic recording head including the coil having small resistance without an increase in the number of manufacturing processes.

In order to accomplish the object, a perpendicular magnetic recording head according to embodiments of the present invention comprises: a main magnetic pole; a magnetic yoke connected with a rear portion of the main magnetic pole; a magnetic shield provided on the side of an air bearing surface and on a trailing side and both sides of the main magnetic pole; a nonmagnetic insulating layer provided on the main magnetic pole and the magnetic yoke; a first coil provided on a leading side of the main magnetic pole; a second coil provided on the nonmagnetic insulating layer, the first and second coils being helically wound around the main magnetic pole and the magnetic yoke; and an upper magnetic pole provided on the trailing side of the main magnetic pole, wherein the nonmagnetic insulating layer has a recessed portion on which the second coil is provided, and the second coil provided on the recessed portion has a thickness increased by the depth of the recessed portion.

A contour part of the recessed portion may have a taper angle of 10 degrees to 60 degrees. The contour part of the recessed portion may have a taper angle of approximately 45 degrees. The recessed portion of the nonmagnetic insulating layer may have a thickness of 0.1 µm or more.

The first and second coils may have a plurality of conductive layer portions crossing the magnetic yoke in the direction of a track width, the conductive layer portions of the first coil may be connected with the respective conductive layer portions of the second coil through respective connection tabs in a region outside the magnetic yoke to respectively constitute helical coils, and the connection tab may be formed by laminating a layer made of the same material as that of the magnetic yoke, a layer made of the same material as that of the magnetic shield, and a layer made of the same material as that of the second coil.

To accomplish the other object, a method for manufacturing a perpendicular magnetic recording head according to embodiments of the present invention may comprise forming a lower magnetic pole; forming a first conductive layer on the lower magnetic pole, the first conductive layer having a plurality of layer portions extending in the direction of a track width; forming a back yoke on a rear edge portion of the lower magnetic pole; forming a magnetic yoke on a central region of the first conductive layer, and using the same material as that of the magnetic yoke to form a first layer of a connection tab in both outer side regions of the central region of the first conductive layer, a front edge portion of the magnetic yoke being located separately from an air bearing surface, a rear edge portion of the magnetic yoke being magnetically connected with the back yoke; forming a main magnetic pole on the magnetic yoke; forming a magnetic shield on a trailing side and both sides of the main magnetic pole, and using the same material as that of the magnetic shield to form a second layer of the connection tab; forming a nonmagnetic insulating layer on the main magnetic pole and the magnetic yoke; forming a recessed portion in the nonmagnetic insulating layer and removing a part of the second layer of the connection tab; forming a second conductive layer having a plurality of layer portions extending in the direction of a track width on the recessed portion, and filling a space, in which the part of the second layer of the connection tab is removed, with the same material as that of the second conductive layer during the formation of the second conductive layer; and forming an upper magnetic pole above the second conductive layer via an insulating layer.

The perpendicular magnetic recording head according to embodiments of the present invention includes the upper coil that constitutes a part of the helical coil and has a thickness that can be increased. Resistance of the coil can therefore be reduced. In addition, since resistance of the connection section for connecting the upper and lower coils can be reduced, resistance of the entire coil can be reduced. This can reduce a protrusion (caused by heat generated from the coils) of a read/write element. Furthermore, in the method for manufacturing a perpendicular magnetic recording head according to embodiments of the present invention, the part of the connection section for connecting the upper and lower coils is removed and replaced with the same material as that of the upper coil in a process for forming the recessed portion in the nonmagnetic insulating layer provided on the main magnetic pole. Therefore, the perpendicular magnetic recording head including the coils having small resistance can be obtained without an increase in the number of manufacturing processes.

Embodiments of the present invention will be described with reference to the accompanying drawings.

Figure 6:
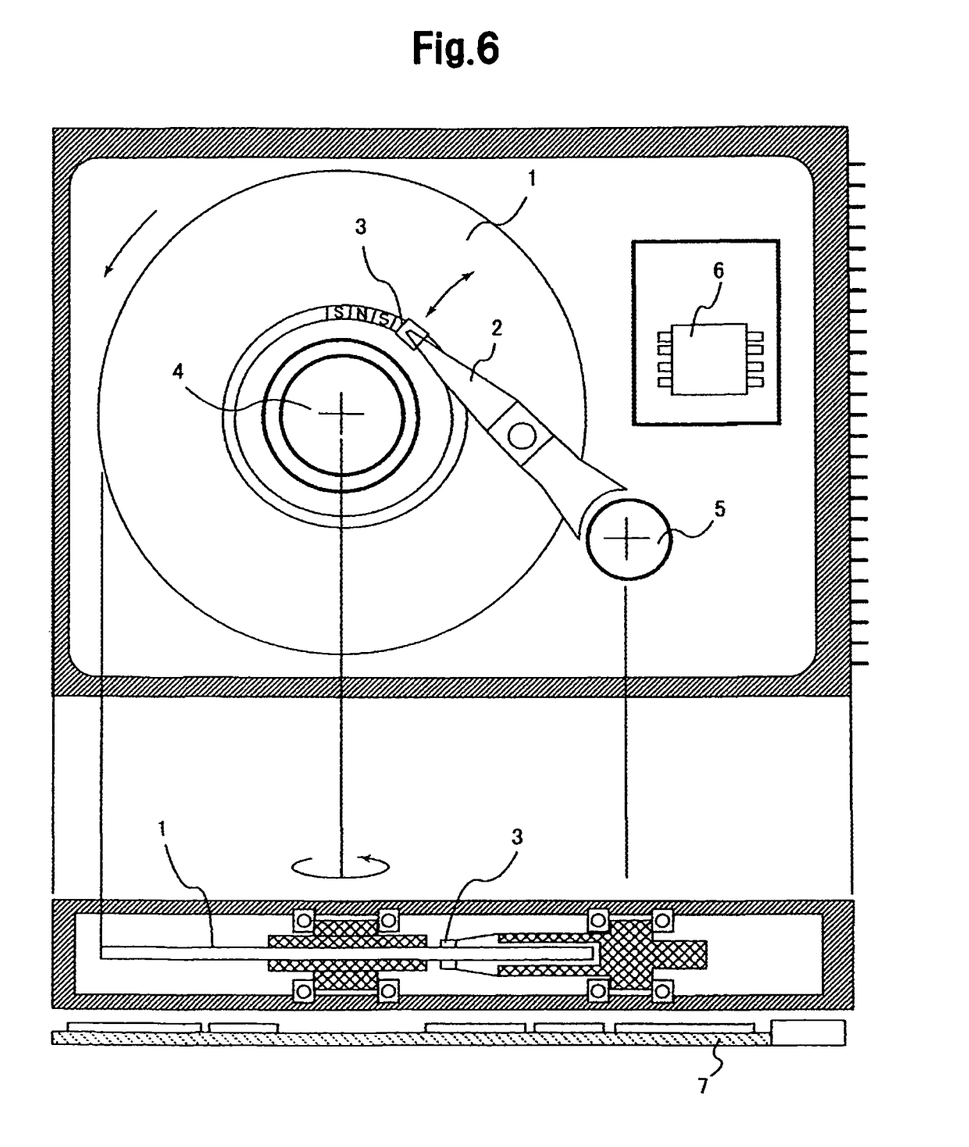
FIG. 6 is a plan view and cross sectional view of an outline configuration of a magnetic disk device.

First, with reference to FIGS. 6 to 9, a description will be made of an outline configuration of a magnetic disk device having a perpendicular magnetic recording head according to embodiments of the present invention, an outline configuration of the perpendicular magnetic recording head, and the principle of perpendicular magnetic recording scheme. FIG. 6 is a plan view and cross sectional view of the outline configuration of the magnetic disk device. The magnetic disk device uses a magnetic head 3 to write and read a magnetization signal on and out of a magnetic disk 1. The magnetic disk 1 is driven and rotated by a motor 4. The magnetic head 3 is fixed to a tip portion of an arm 2. The arm 2 is driven by an actuator 5 and moves in a radial direction of the disk to position the magnetic head 3 above a track on which data is to be written or read. A recording signal supplied to the magnetic head 3 and a reproduction signal output from the magnetic head 3 is processed by a preamplifier 6. A control circuit for controlling the motor 4 and the actuator 5, a signal processing circuit for encoding a recording signal and decoding a reproduction signal, and the like are mounted on a circuit substrate 7 attached to a bottom surface of the magnetic disk device.

Figure 7:
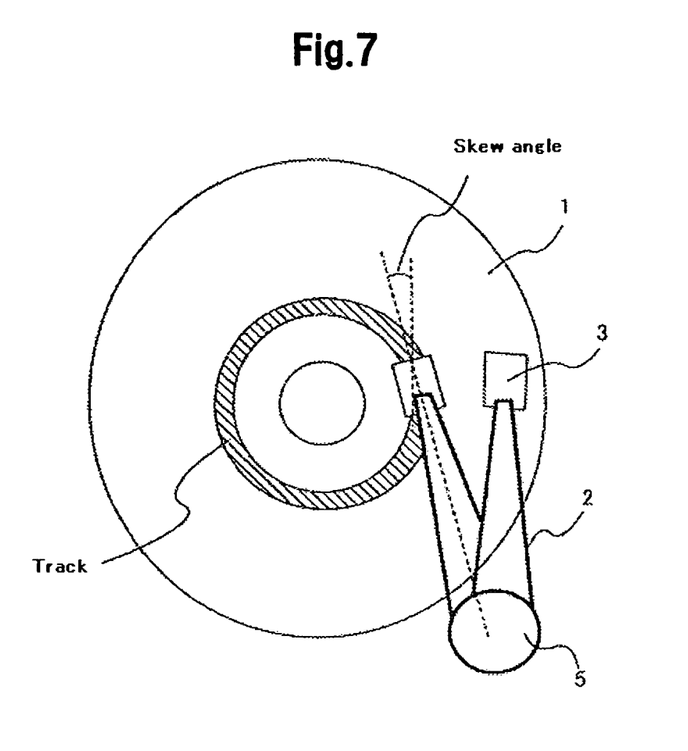
FIG. 7 is a schematic diagram showing a skew occurring to a magnetic head during an operation of the magnetic head.

FIG. 7 shows the position of the magnetic head 3 when the magnetic head 3 is moved in the radial direction of the magnetic disk 1 by swinging the arm 2. In this case, a skew angle occurs as shown in the drawing. The skew angle is an angle formed by a direction of airflow above the magnetic disk and a longitudinal direction of the magnetic head 3. The skew angle is in a range of approximately ±20 degrees.

Figure 8:
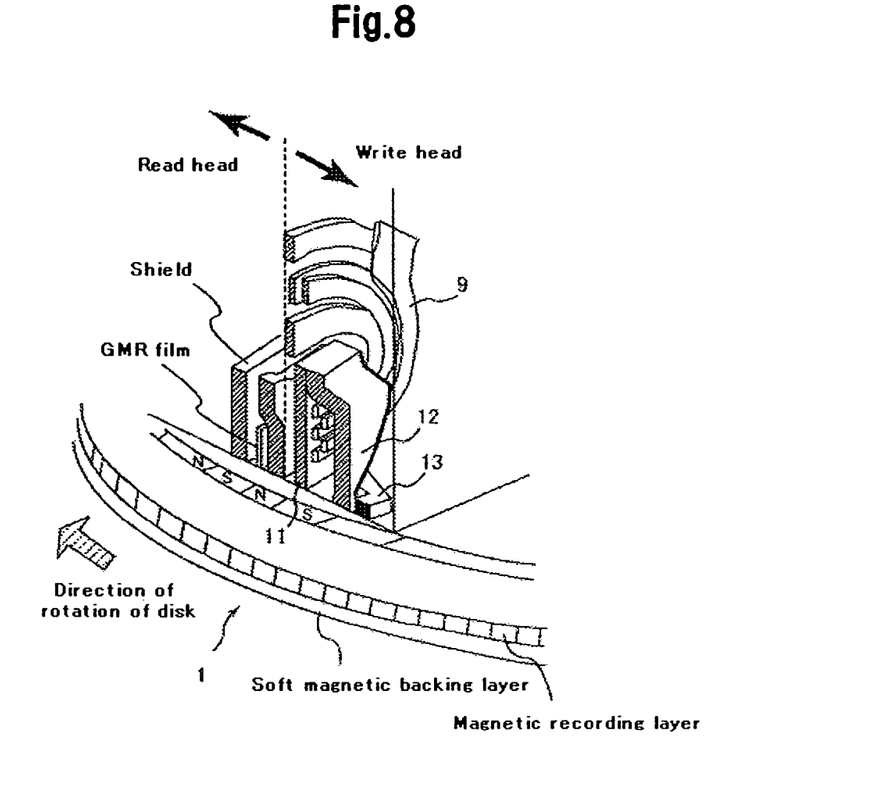
FIG. 8 is a diagram showing an outline configuration of the perpendicular magnetic recording head.

FIG. 8 schematically shows the relationship between a basic configuration of the perpendicular magnetic recording head used as the magnetic head 3 and the magnetic disk. FIG.

Figure 9:
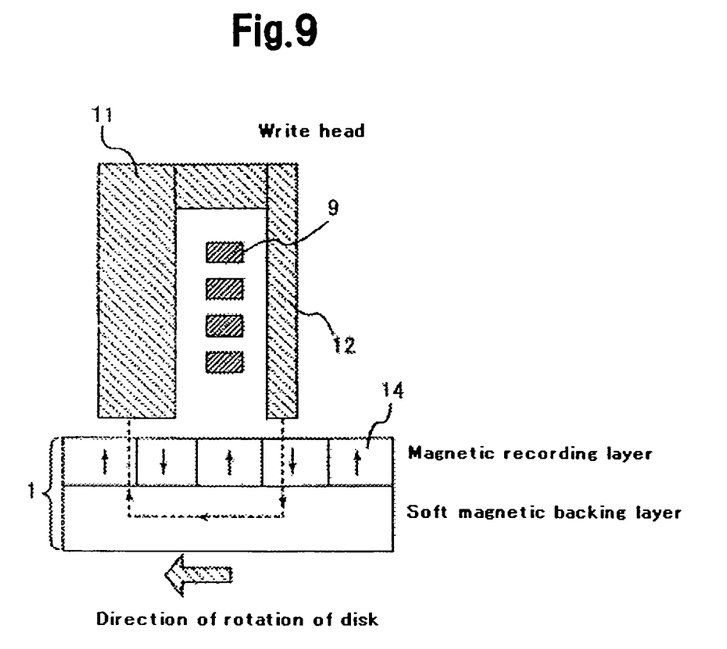
FIG. 9 is a schematic diagram showing the principle of perpendicular magnetic recording.

10 is a diagram showing the principle of perpendicular magnetic recording. The perpendicular magnetic recording head is composed of a write head and a read head. The write head is adapted to generate a magnetic field to write data on a magnetic recording layer of the magnetic disk 1. The write head is a single magnetic pole head and has a main magnetic pole 12, an auxiliary magnetic pole 11, and a thin film coil 9. The thin film coil 9 intersects with a magnetic circuit formed by the main magnetic pole 12 and the auxiliary magnetic pole 11. The read head is adapted to read information written in the magnetic recording layer of the magnetic disk 1. The read head has a read element such as a GMR film sandwiched between a pair of read shields. A magnetic flux generated from the main magnetic pole 12 of the write head passes through the magnetic recording layer of the magnetic disk 1 and a soft magnetic backing layer of the magnetic disk 1, and returns to the auxiliary magnetic pole 11 to form a magnetic flux path and thereby cause a magnetization pattern 14 to be written in the magnetic recording layer.

Figure 1:
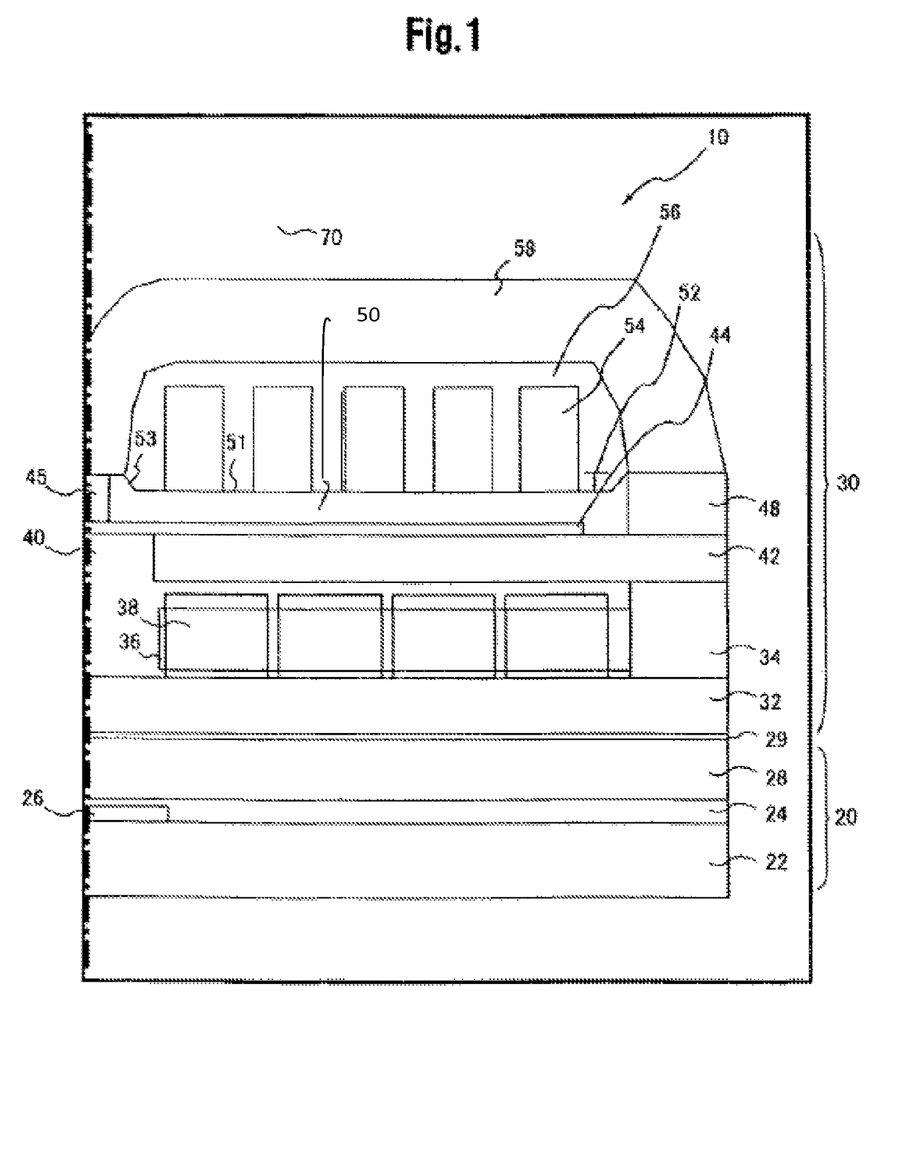
FIG. 1 is a cross sectional view of a layer configuration of a perpendicular magnetic recording head according to an embodiment of the present invention.
Figure 2:
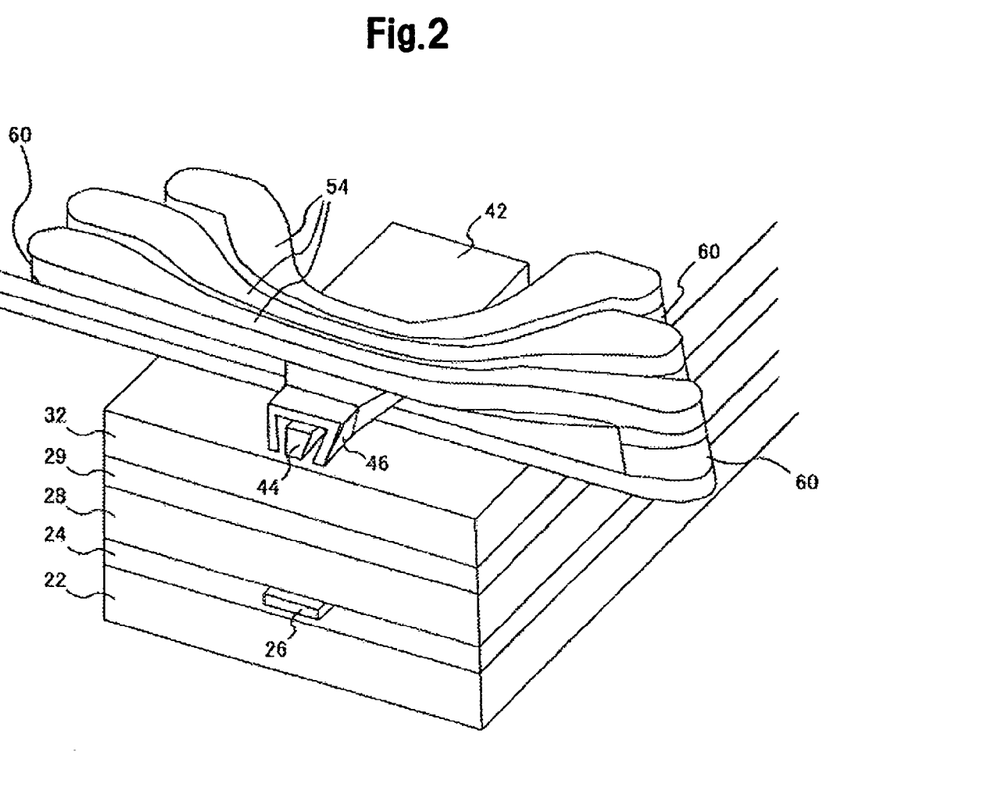
FIG. 2 is a schematic perspective view of a part of the perpendicular magnetic recording head shown in FIG. 1.
Figure 3:
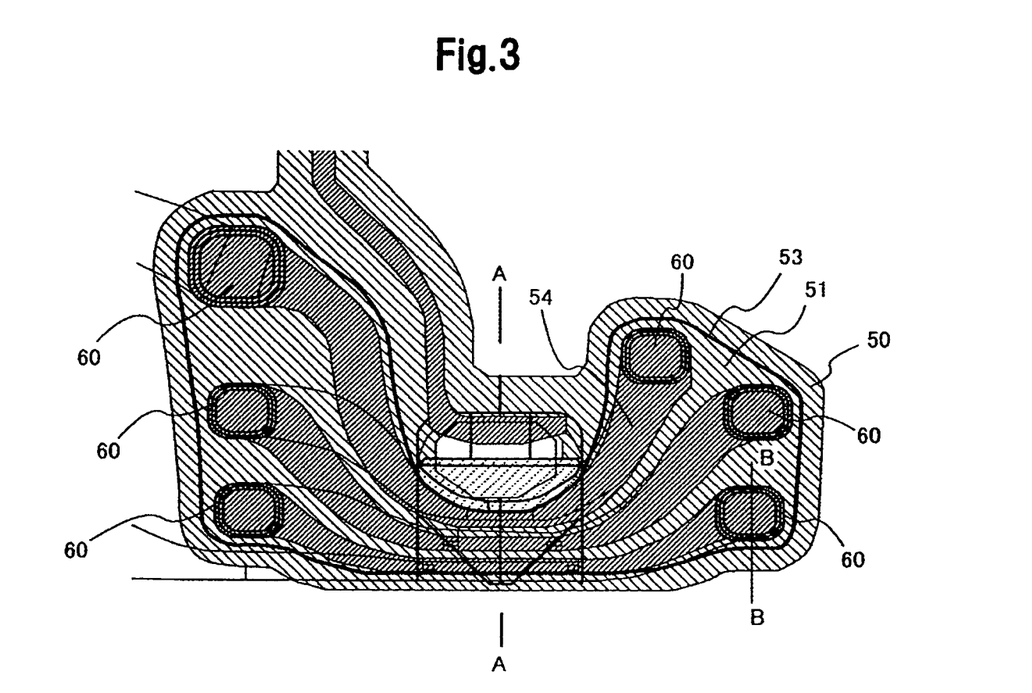
FIG. 3 is a schematic plan view of a part of the perpendicular magnetic recording head shown in FIG. 1.

Next, a description will be made of the configuration of a perpendicular magnetic recording head according to an embodiment of the present invention with reference to FIGS. 1 to 3. FIG. 2 is a schematic diagram showing an outline configuration of the perpendicular magnetic recording head obtained after an upper layer coil (second coil) 54 is formed. FIG. 3 is a plan view of FIG. 2 and schematically shows an arrangement of the second coil 54 and a connection tab 60. FIG. 1 is a cross sectional view taken along line A-A of FIG. 3 and shows a layer configuration of the perpendicular magnetic recording head 10 according to the present embodiment. The perpendicular magnetic recording head 10 has a single magnetic pole head and a magnetoresistance effect read head. The single magnetic pole head serves as a write head 30. The magnetoresistance effect read head serves as a read head 20. The single magnetic pole head serving as the write head 30 has a main magnetic pole 44, a magnetic yoke 42, a lower magnetic pole (auxiliary magnetic pole) 32, a first coil 38, the second coil 54, a magnetic shield 46, and an upper magnetic pole 58. The first and second coils 38 and 54 constitute a helical coil. The magnetic shield 46 covers a portion (on the side of an air bearing surface) of the main magnetic pole 44. The magnetoresistance effect read head serving as the read head 20 has a magnetoresistance effect element 26 provided between a pair of read shields (a lower magnetic shield layer 22 and an upper magnetic shield layer 28) and in a nonmagnetic gap layer 24. A giant magnetoresistance effect (GMR) element, a tunnel magnetoresistance effect (TMR) element capable of providing a large reproduction output, a current perpendicular to plane (CPP) GMR element capable of causing a current to flow perpendicularly to a film surface, or the like may be used as the magnetoresistance effect element 26.

Figure 4:
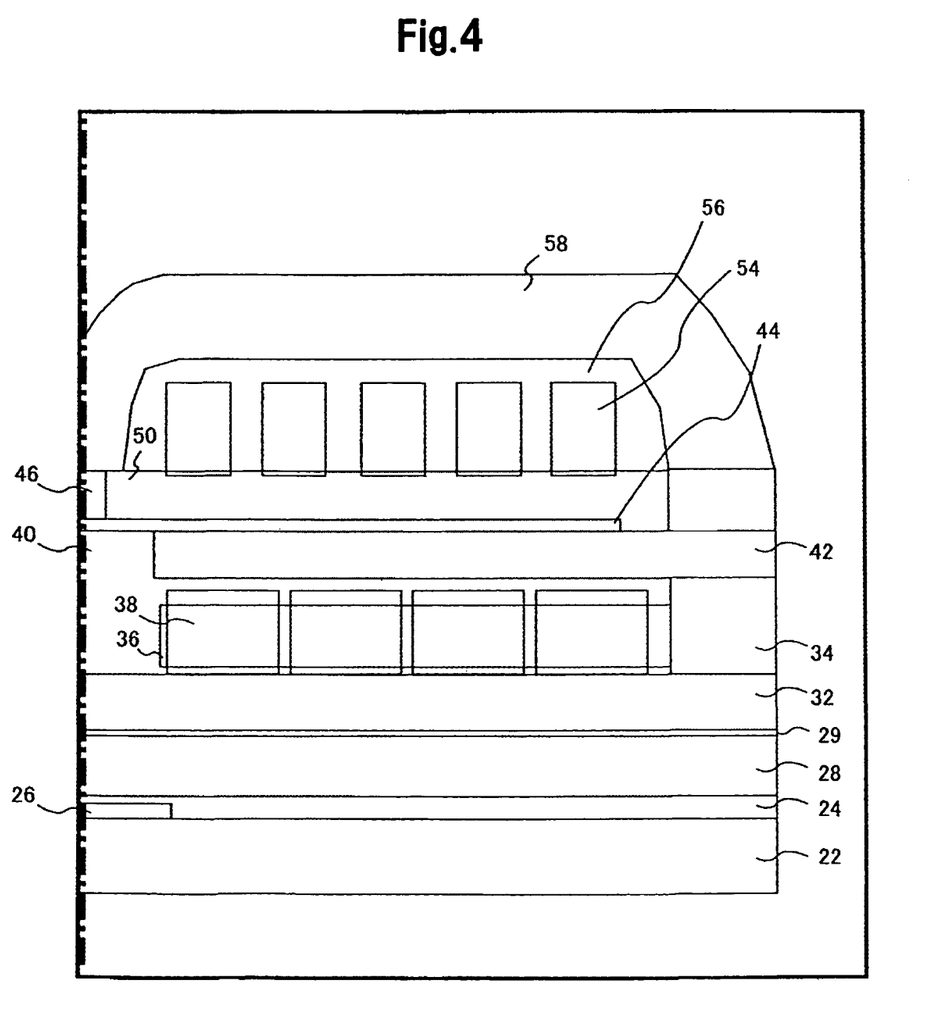
FIG. 4 is a cross sectional view of a layer configuration of a perpendicular magnetic recording head used in a comparative example.

The write head 30 is designed to reduce resistance of the helical coil. Specifically, as shown in FIGS. 1 to 3, a nonmagnetic insulating layer 50 formed on the main magnetic pole 44 and the magnetic yoke 42 is etched to form a recessed portion 51. In a process of forming the second coil 54 on the recessed portion 51, the thickness of the second coil 54 is increased by the depth 52 of the recessed portion 51 to reduce the resistance of the helical coil. FIG. 4 is a schematic diagram showing the state where the nonmagnetic insulating layer 50 is not etched, as a comparative example. In FIG. 4, when the thickness of the second coil 54 is to be increased for reduction of the resistance of the helical coil, a resist insulating layer 56 adapted to protect the second coil 54 is not rigidly attached to the second coil 54. This significantly increases the possibility that a failure of insulation with the upper magnetic pole 58 provided on the resist insulating layer 56 occurs. In the present embodiment, in order to set the thickness of the second coil 54 to be large, the nonmagnetic insulating layer 50 provided under the second coil 54 is etched to ensure that the height of the second coil 54 from a non-etched surface of the nonmagnetic insulating layer 50 is nearly equal to the height of the second coil 54 obtained in the case where the nonmagnetic insulating layer 50 is not etched.

This method makes it possible to reduce the percentage of the failure of the insulation with the upper magnetic pole 58 to the same level as the percentage of the insulation failure in the case where the thickness of the second coil is not increased. The etching of the nonmagnetic insulating layer 50 may be dry etching such as ion milling or wet etching. The etched layer is a nonmagnetic insulating body. Alumina, a resist or the like is suitable for the nonmagnetic insulating body. In the present embodiment, an alumina layer is etched by ion milling using an Ar gas. The depth of the recessed portion of the alumina layer is 0.3 µm. The depth of the recessed portion can be arbitrarily set. The deeper the recessed portion is, the larger the thickness of the second coil can be. When the depth of the recessed portion is large, an effect of the reduction in the resistance of the coil is large. When the thickness of the nonmagnetic insulating layer 50 remaining after the etching is small, a failure of insulation between the second coil 54 and metal films (42, 44) provided under the nonmagnetic insulation layer 50 may occur. Based on the result of the experiment, it is found out that the thickness of the nonmagnetic insulating layer 50 needs to be 0.1 µm or more. In addition, a contour part 53 of the recessed portion 51 may have a tapered shape with a taper angle of 10 degrees to 60 degrees, or a taper angle of approximately 45 degrees. When the taper angle is obtuse, the depth of the recessed portion cannot be large. On the other hand, when the taper angle is acute, the shape of a resist pattern may be abnormal due to halation in a process for forming the second coil.

As described above, the nonmagnetic insulating layer 50 is recessed by approximately 0.3 µm to form the recessed portion 51, and the second coil 54 is formed on the recessed portion 51. The thickness of the second coil 54 can be increased by 0.3 µm, although the thickness of the original second coil is 2.0 µm. That is, the thickness of a conductive layer of the second coil 54 can be increased to 2.3 µm. The resistance of the coil can be reduced by approximately 0.5Ω.

As described above, according to one embodiment, recessed portion 51 is formed in the nonmagnetic insulating layer 50 provided on the main magnetic pole 44, and the upper layer coil 54 of the helical coil is formed on the recessed portion 51. The thickness of the upper layer coil 54 can be increased by the depth 52 of the recessed portion 51 to reduce the resistance of the helical coil. This can reduce a protrusion of a read/write element due to heat generated from the coil. There is no problem with the shape of the resist insulating film 56 formed on the second coil 54 and attachment of the resist insulating film 56. The percentage of a failure of insulation with the upper magnetic pole 58 is nearly equal to 0.

Figure 5:
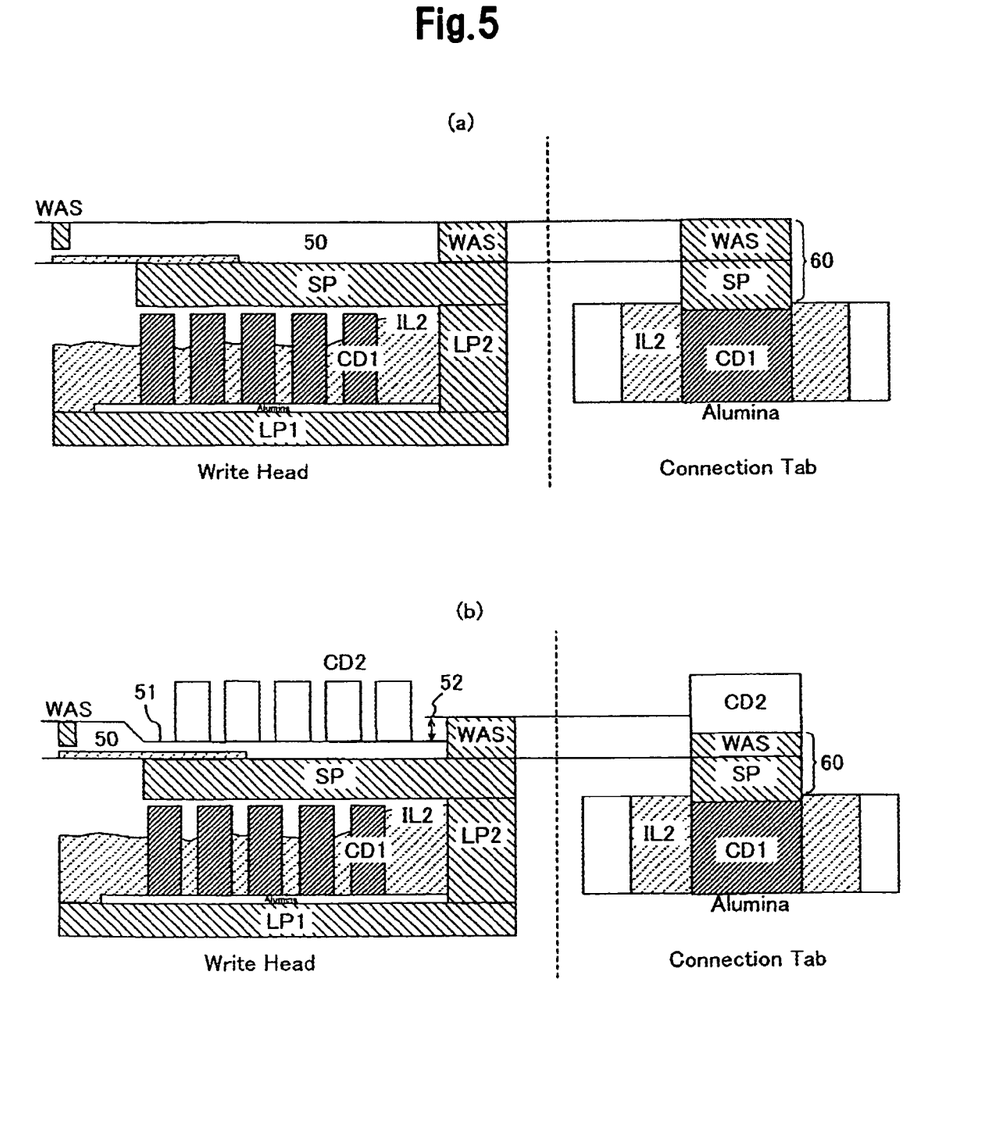
FIGS. 5(a) and 5(b) are schematic cross sectional views showing a process for manufacturing a connection tab.

Next, a description will be made of a method for manufacturing the perpendicular magnetic recording head according to one embodiment with reference to FIGS. 1 to 5(b). FIGS. 5(a) and 5(b) are schematic diagrams showing a cross sectional structure of a connection section (connection tab) for connecting the first and second coils to compare the connection section with the write head. Formation of the connection section and formation of the write head are simultaneously performed. The left sides of FIGS. 5(a) and 5(b) are schematic cross sectional views taken along line A-A of FIG. 3, while the right sides of FIGS. 5(a) and 5(b) are schematic cross sectional views taken along line B-B of FIG. 3. Referring to FIGS. 1 to 5(b), a lower magnetic shield layer 22, the nonmagnetic gap layer 24, the magnetoresistance effect film 26 and the upper magnetic shield layer 28 are formed on an insulating substrate (not shown) in this order by sputtering to form the read head 20. The lower magnetic shield layer 22 is made of NiFe or the like. The nonmagnetic gap layer 24 is made of alumina or the like. The upper magnetic shield layer 28 is made of NiFe or the like. The magnetoresistance effect film 26 is located in the nonmagnetic gap layer 24. Subsequently, an upper magnetic shield insulating layer 29 is formed on the upper magnetic shield layer 28 of the read head 20 and made of alumina or the like. A lower magnetic pole (LP1) 32 is formed on the upper magnetic shield insulating layer 29 and made of NiFe or the like. A first back yoke (LP2) 34 is formed on a rear edge portion of the lower magnetic pole (LP1) 32 and made of NiFe or the like. Then, a gap layer (IL2) 36 and a first conductive layer (CD1) are formed on the lower magnetic pole 32. The gap layer (IL2) 36 is made of alumina or the like. The first conductive layer (CD1) is located in the gap layer (IL2) 36. The first conductive layer (CD1) has a plurality of layer portions constituting the lower layer coil (first coil) 38 and is made of copper. The first coil 38 may be formed in an interlayer insulating layer made of an organic insulating body and separately from the gap layer 36 made of alumina or the like. A magnetic yoke (SP) 42 is formed on the gap layer (IL2) 36 and made of a Co alloy. The magnetic yoke (SP) 42 is located separately from the air bearing surface. An inorganic insulating layer 40 is formed in a space between the air bearing surface and the magnetic yoke (SP) 42.

In this case, as shown in FIG. 5(a), a first layer (SP) of the connection tab 60 is formed on an outside portion (located in the direction of a track width) of the first conductive layer (CD1), simultaneously with the formation of the magnetic yoke (SP) (refer to the right sides of FIGS. 5(a) and 5(b)). The first layer (SP) of the connection tab 60 is made of the same material as that of the magnetic yoke (SP). Then, an upper surface of the inorganic insulating layer 40 and an upper surface of the magnetic yoke are planarized by chemical mechanical polishing (CMP) or the like. Then, a plurality of magnetic thin films (Co alloy) is laminated on the upper surface of the inorganic insulating layer 40 and the upper surface of the magnetic yoke 42 to form a magnetic layer serving as the main magnetic pole 44. The main magnetic pole 44 extends from the air bearing surface to a location at which the main magnetic pole 44 and the magnetic yoke 42 overlap each other. Then, ion milling is performed to etch the main magnetic pole 44 and thereby shape the main magnetic pole 44 into an inverted trapezoid when viewed from the air bearing surface (refer to FIG. 2). Thus, the main magnetic pole 44 has tapers on its sides. Since the main magnetic pole 44 has the inverted trapezoidal shape, a magnetization signal written on an adjacent track is not erroneously erased when the skew occurs to the write head, as shown in FIG. 7. Then, a magnetic shield (WAS) 46 is formed on the side of the air bearing side and on the trailing side and both sides of the main magnetic pole 44. The magnetic shield (WAS) 46 is made of NiFe or the like. A second back yoke 48 is formed on a rear edge portion of the magnetic yoke 42. In this case, as shown in FIG. 5(a), a second layer (WAS) of the connection tab 60 is formed on the first layer (SP) of the connection tab 60, simultaneously with the formation of the magnetic shield (WAS) 46. The second layer of the connection tab 60 is made of the same material as that of the magnetic shield (WAS) 46. Subsequently, the nonmagnetic insulating layer 50 is formed on the main magnetic pole 44 and the magnetic yoke 42 and is not formed on the magnetic shield 46. The nonmagnetic insulating layer 50 is made of alumina or the like.

After the formation of the nonmagnetic insulating layer 50, a pattern is formed only in the etched area by means of a resist. Then, ion milling is performed using the pattern as a mask to etch the nonmagnetic insulating layer 50 and thereby form the recessed portion 51 therein. Simultaneously, a part of the second layer (WAS) of the connection tab 60 is removed by the ion milling. An incident angle of an ion used for the ion milling may be in a range of approximately 20 degrees to 40 degrees. After that, a second conductive layer (CD2) is formed. The second conductive layer (CD2) has a plurality of layer portions constituting the second coil 54 and is made of copper. Since the second coil 54 is formed on the recessed portion 51, the thickness of the second conductive layer (CD2) constituting the second coil 54 increases by the depth of the etched portion 52 of the recessed portion 51. In the present embodiment, the ion milling is performed for 30 minutes to form the recessed portion 51 having the depth 52 of approximately 0.3 μm in the nonmagnetic insulating layer 50. Since the thickness of the original second coil is 2.0 μm, the thickness of the second coil according to the present embodiment is increased to 2.3 μm. The resistance of the coil is reduced by approximately 0.5Ω. When the ion milling is performed, a portion of the second layer (WAS) (made of NiFe or the like) of the connection tab 60 is etched to reduce the thickness of the second layer by approximately 0.3 μm. In the subsequent process for forming the second coil 54, a metal film having low resistance is formed on the etched region of the second layer and made of copper or the like. This can reduce resistance of the connection tab 60. Since a coil having a helical structure is used, a coil connection section of the helical structure has resistance significantly larger than that of a coil connection section of a planer coil structure. Therefore, the effect of the reduction in the resistance is large.

Next, the organic insulating layer 56 is formed between side portions of the second coil 54 and on upper portions of the second coil 54. Then, the upper magnetic pole 58 is formed and made of NiFe or the like to ensure that the upper magnetic pole 58 is connected with the magnetic shield 46 on the air bearing surface side of the upper magnetic pole 58 and connected with the second back yoke 48 on the rear edge side of the upper magnetic pole 58. Subsequently, a hard protective layer 70 is formed to entirely cover the structure (excluding the air bearing surface) of the formed elements and made of alumina or the like. Lastly, a write terminal (not shown) and a read terminal (not shown) are formed. The write terminal is adapted to supply a current to the conductive coil. The read terminal is adapted to transmit a signal current supplied from the read head to the external.

In the one embodiment, the example of the configuration including the first back yoke 34 and the second back yoke 48 is described above. However, when the rear edge portion of the lower magnetic pole 32 and a rear edge portion of the upper magnetic pole 58 substantially form a magnetic flux path for the magnetic yoke 42, the first back yoke 34 and the second back yoke 48 may be removed.

As described above, according to the manufacturing method, the connection tab for connecting the lower and upper coils is made of the same material as that of the write head element. In addition, the part of the second layer of the connection tab is removed during the formation of the recessed portion provided for the formation of the upper coil. Furthermore, the space in which the part of the second layer of the connection tab is removed is filled with the same material as that of the upper coil. Therefore, the resistance of the entire coil can be reduced without an increase in the number of the manufacturing processes.

As described above, the thickness of the upper coil is increased to reduce the resistance of the coil and the resistance of the connection section for connecting the upper and lower coils. Therefore, a protrusion of the read/write element due to heat generated from the coil can be significantly reduced. The amount of the heat generated from the coil is linearly proportional to the resistance of the coil. The reduction in the resistance of the entire coil is most effective to suppress the heat generation.

In certain embodiments, the write element using the perpendicular recording scheme is used as the write head. In addition to the element using the perpendicular recording scheme, an element using an in-plane recording scheme may be used as the write element.

What is claimed is:

1. A perpendicular magnetic recording head comprising:
   a main magnetic pole;
   a magnetic yoke connected with a rear portion of the main magnetic pole;
   a magnetic shield provided on an air bearing surface and on a trailing side and both sides of the main magnetic pole;
   a nonmagnetic insulating layer provided on the main magnetic pole and the magnetic yoke;
   a first coil provided on a leading side of the main magnetic pole;
   a second coil provided on the nonmagnetic insulating layer, the first and second coils being helically wound around the main magnetic pole and the magnetic yoke;
   an upper magnetic pole provided on the trailing side of the main magnetic pole, wherein, the nonmagnetic insulating layer has a recessed portion on which the second coil is provided, and the second coil provided on the recessed portion extends beyond the non-recessed portion of the nonmagnetic insulating layer, wherein the second coil has a thickness that is substantially equal to the depth of the recessed portion plus the distance the second coil extends beyond the non-recessed portion of the nonmagnetic insulating layer; and
   wherein the nonmagnetic insulating layer has non-recessed portions on both sides of the second coil and
   wherein, each of the first and second coils has a plurality of conductive layer portions crossing the magnetic yoke in the direction of a track width, the conductive layer portions of the first coil are connected with the respective conductive layer portions of the second coil through respective connection tabs in a region outside the magnetic yoke to respectively constitute helical coils, and the connection tab is formed by laminating a layer made of the same material as that of the magnetic yoke, a layer made of the same material as that of the magnetic shield, and a layer made of the same material as that of the second coil; and
   wherein the connection tab is formed, at least in part, by etching.

2. The perpendicular magnetic recording head according to claim 1, wherein a contour part of the recessed portion has a taper angle of between about 10-60 degrees.

3. The perpendicular magnetic recording head according to claim 1, wherein a contour part of the recessed portion has a taper angle of approximately 45 degrees.

4. The perpendicular magnetic recording head according to claim 1, wherein the recessed portion of the nonmagnetic insulating layer has a thickness of 0.1 µm or more.

5. The perpendicular magnetic recording head according to claim 1, wherein the connection tab comprises a Co alloy layer, a NiFe alloy layer and a Cu layer, which are formed on the first coil.

6. The perpendicular magnetic recording head according to claim 1, further comprising a lower magnetic pole provided under the first coil on the leading side of the main magnetic pole, wherein a rear edge portion of the lower magnetic pole is magnetically connected with the magnetic yoke.

7. The perpendicular magnetic recording head according to claim 6, further comprising a read head that has a read element provided between an upper magnetic shield and a lower magnetic shield and is adjacent to the lower magnetic pole.

8. The perpendicular magnetic recording head according to claim 1, wherein the second coil has a thickness of about 0.3 µm and the distance the second coil extends beyond the non-recessed portion of the nonmagnetic insulating layer is about 2.0 µm.

9. The perpendicular magnetic recording head according to claim 1, wherein the main magnetic pole has a shape of an inverted trapezoid when viewed from the air bearing surface.

* * * * *